Feb. 11, 1947.  F. J. MacDONALD  2,415,504
MOLDING APPARATUS
Filed Sept. 16, 1943
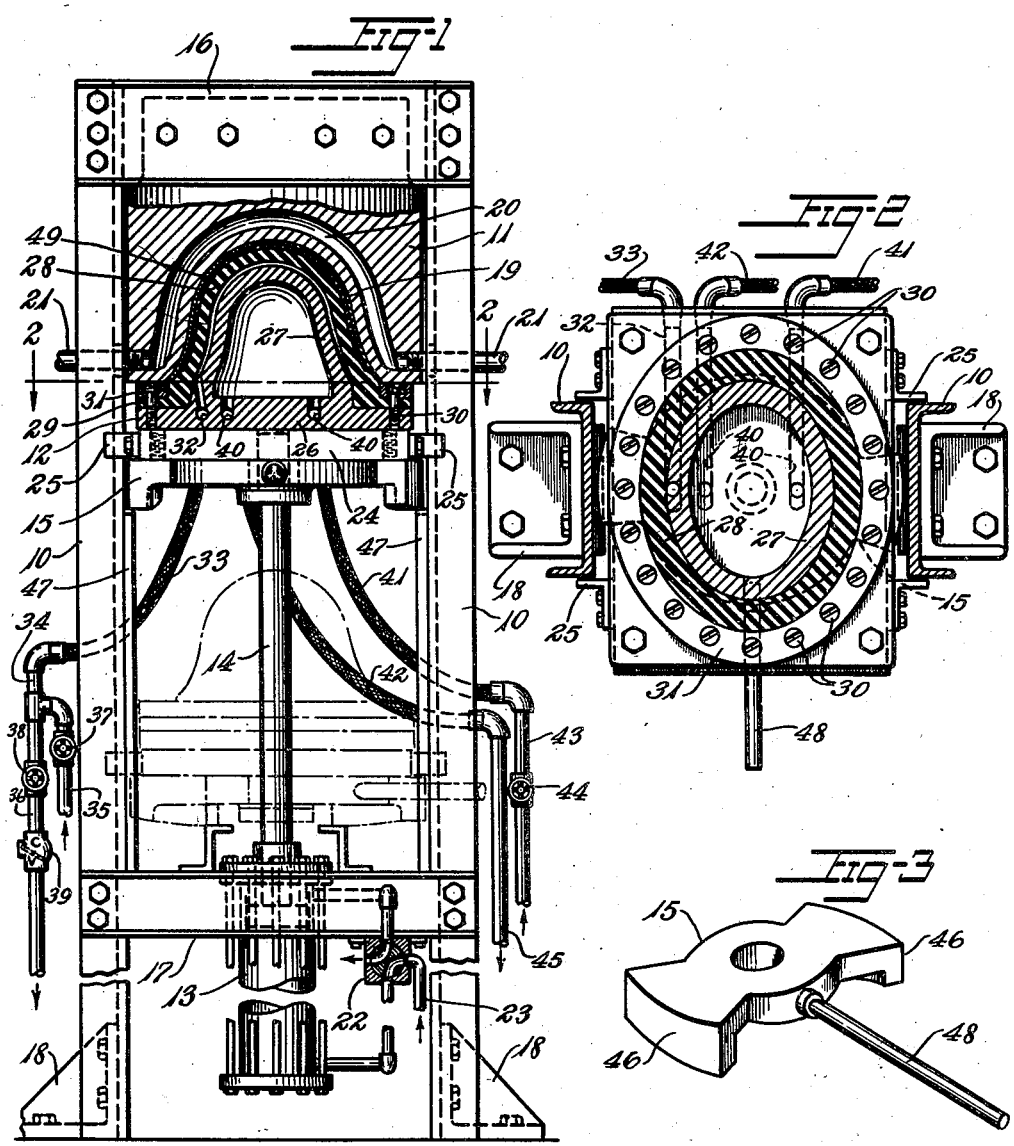
Inventor
Frank J. MacDonald
By Willis F. Avery
Atty.

Patented Feb. 11, 1947

2,415,504

UNITED STATES PATENT OFFICE 2,415,504

MOLDING APPARATUS

Frank J. MacDonald, Brookline, Mass., assignor to The B. F. Goodrich Company, New York, N. Y., a corporation of New York Application September 16, 1943, Serial No. 502,597

6 Claims. (Cl. 18—19)

This invention relates to apparatus for molding moldable materials, and relates particularly to an apparatus especially adapted for molding cup-shaped articles such as soldiers' helmet liners of the type in which resin-treated fabric elements are assembled and molded in the desired helmet shape.

It is an object of this invention to provide improved molding apparatus wherein moldable materials such as blanks comprising thermoplastic or thermosetting resins may be molded at either high or low pressure to produce superior molded products, and generally to provide efficiency and economy in molding apparatus and methods. Other objects will become apparent in the detailed description of the invention given hereinafter.

The molding apparatus of this invention comprises, broadly, at least two mold members arranged for relative movement of at least one of the members toward and away from the other and with the confronting faces of the mold members, when in molding relationship, defining a molding cavity substantially larger than the molded article to be produced. There are also provided means for moving the mold members into molding relationship with each other and means for holding the mold members together in such molding relationship. In the molding cavity defined by the confronting faces of the locked mold members there is provided means confined to one section of said cavity for applying pressure to a moldable material confined within another section of said cavity. This last named means preferably comprises an extensible diaphragm arranged across the aforementioned molding cavity so as to divide it into two sections. In one of these sections is confined the material to be molded while the other section is connected to a source of fluid pressure.

The invention will be described with reference to a particular embodiment as illustrated in the accompanying drawing.

Of the drawing:

Fig. 1 is an elevation, partially broken away, showing apparatus for molding helmet liners, the mold being shown in closed, or molding, position.

Fig. 2 is a horizontal section taken along line 2—2 of Fig. 1.

Fig. 3 is a perspective view of the latch for locking the mold in closed position.

Fig. 4 is an elevation of a helmet liner after it has been molded in the molding apparatus of this invention, and then trimmed to shape.

In the specific embodiment of the invention described herein, the apparatus comprises a pair of parallel channel iron uprights 10, 10, a top mold member 11, a bottom mold member 12, an air cylinder 13 with its ram 14 for raising and lowering the bottom mold member, and a latch casting 15 for locking the two mold members together in molding relationship after the bottom mold member 12 has been raised into position.

In order to give the framework strength and rigidity there are provided two pairs of parallel horizontal channel iron beams extending from one upright to the other, the first pair 16, 16 being located at the top of the iron uprights, while the second pair 17, 17 of cross beams is located near the bottom of the uprights. Both pairs of cross beams are bolted to the uprights to hold them rigidly in a spaced apart parallel relationship. The uprights may be bolted to the floor by means of foot angles 18, 18 located at the bottom of the uprights 10, 10.

The top mold member 11 comprises a cylindrical block of cast iron or other suitable material suspended between the uprights 10, 10 from the pair of top beams 16, 16. To provide a molding space for the helmet liner the lower face of the top mold member has a hollowed out portion lined with a thin stainless steel shell 19 whose inner surface has the same shape and dimensions as the outer surface of a helmet liner. The hollowed out portion of the upper mold member is surrounded by a steam chamber 20 communicatingly connected to a steam supply by a pair of pipes 21, 21.

In order to raise and lower the bottom mold member 12 there is provided near the bottom of the apparatus the air cylinder 13 suspended from the bottom pair of beams 17, 17. The flow of air to the cylinder to raise and lower its ram is controlled by an ordinary four-way valve 22 placed in a high pressure air supply line 23. On the top of the air cylinder ram 14 is mounted a platform 24 to which is fastened the bottom mold member 12. The platform 24 is guided in its vertical movement between the iron uprights 10, 10 by two pairs of iron angles 25, 25 projectingly mounted on the platform 24 and respectively embracing the uprights 10, 10.

The bottom mold member 12 comprises a one-piece casting consisting of a base 26 bolted to the platform 24 and a hollow dome 27 shaped to extend up into, but not to fill, the hollowed out portion of the top mold member 11.

The top mold member 11 and the bottom mold member 12 are so constructed that when they are locked in molding relationship there remains a molding cavity between the dome 27 and the stainless steel shell 19. Across this molding space is arranged an extensible diaphragm 28 preferably of rubbery material having a domed shape. The rubbery diaphragm 28 is constructed with a flaring skirt or flange 29 that is secured to the bottom mold member by means of bolts 30, 30 extending through a clamping ring 31 into the base 26 of the bottom mold member 12. In molding helmet liners, a space of about ¼ inch should remain between the rubbery diaphragm 28 and the dome 27 of the bottom mold member 12 and a space of similar dimensions should remain between the rubbery diaphragm 28 and the steel shell 19 of the top mold member 11, although the latter space may be varied, of course, to suit the particular object being molded.

In the construction as shown in Fig. 1, with the top mold member 11 and the bottom mold member 12 in molding relationship, the steel shell 19 and the dome 27 are held apart by the flange 29 of the rubbery diaphragm and the clamping ring 31 to provide the molding cavity. The rubbery diaphragm 28 extends across this molding cavity leaving a small space between the dome and the diaphragm, and a small space between the diaphragm and the steel shell, as has been described hereinabove.

To provide for the application of molding pressure to a helmet liner blank located in the space between the steel shell 19 and the rubbery diaphragm 28, the space between the dome and the diaphragm is connected to a source of fluid pressure by means of a passageway 32 which in turn communicates with a flexible hose 33 leading to a water pipe 34 having an inlet branch 35 and an outlet branch 36. The water supply is controlled by means of a first valve 37 in the inlet branch 35 and a second valve 38 in the outlet branch 36 together with a check valve 39 in the outlet branch 36 which only permits water to flow away from the apparatus.

In order to supply heat to the bottom mold member 12 the hollow dome 27 is provided with a source of steam comprising a pair of passageways 40, 40 in the base 26 of the bottom mold member 12 and extending from the interior of the hollow dome 27 to the outside. The outside of these passageways is connected to a pair of flexible hose 41, 42, one of said hose 41 being for steam inlet and the other 42 for steam outlet. The steam inlet hose 41 is connected to a steam pipe 43 in which there is located a valve 44 for the control of the steam flow. The steam outlet hose 42 is connected to a second pipe 45 through which the steam is exhausted.

To provide for locking the two mold members in molding relationship there is located, directly under the platform 24, a rotatable latch casting 15 (Fig. 3) constructed to rotate on the ram 14. This latch casting is of a generally circular shape with two outwardly extending faces 46, 46 diametrically opposite each other. Each face has generally the shape of a segment of a circle. The two faces 46, 46 of the latch casting 15 extend beyond the edge of the platform 24 and just short of contacting the pair of iron uprights 10, 10, when the mold is in closed position (Fig. 2). The two latch faces 46, 46 have inclined surfaces on the bottom for latching, in a breech-lock type action, against the top ends of two generally flat iron bars 47, 47 mounted on the confronting surfaces of the two iron uprights 10, 10. As the latching action is of a breech-lock type the bottom surfaces are inclined in directions opposite to each other. Thus, these bottom surfaces exert a cam-like action against the top ends of the iron bars 47, 47. In order to manipulate the rotatable latch casting it is provided with a rod-like handle 48 extending outwardly and in substantially the same plane as the casting.

In molding a helmet liner the molding apparatus is first arranged in open position, as indicated by the dotted lines of Fig. 1. Steam at a suitable pressure such as 125 pounds per sq. in. gauge pressure (353° F.) is admitted to the steam chamber 20 of the top mold member 11 and into the hollow dome 27 of the bottom mold member 12. A solution of soap in water is applied to the rubbery diaphragm 28 to prevent sticking of the helmet liner, and a liner blank consisting of fabric treated with a moldable resin and arranged in a helmet-like shape is placed over the diaphragm 28 and drawn down snugly by hand. The four-way valve 22 in the high pressure air supply line 23 to the air cylinder 13 is turned to the position shown (Fig. 1). This forces air in at the bottom of the cylinder and raises the ram 14, the entrapped air at the top of the cylinder being exhausted through the other ports of the four-way valve into the atmosphere.

When the air cylinder 13 and ram 14 has raised the bottom mold member 12 into molding relationship with the top mold member 11 the handle 48 on the latch casting 15 is moved to the left (Fig. 1) to lock the two mold members into position. Then the valve 37 in the water inlet line 35 is opened and water at about 240 pounds per sq. in. pressure is admitted to the space between the dome 27 and the inner surface of the rubbery diaphragm 28. As the rubbery diaphragm is extensible this water pressure is transmitted to the helmet liner blank.

During the molding the helmet liner blank receives the greater amount of heat from the steam chamber 20 in the upper mold member 11, but after a short time the steam in the dome 27 heats the thin layer of high pressure water surrounding the dome and this heat is also transmitted through the rubbery diaphragm 28 to the liner blank, the time required to raise the water to molding temperatures being reduced to a minimum because of the small volume of water present in the space between the dome and the diaphragm.

As soon as the resin of the helmet liner has become set, which in the case of the preferred phenol-formaldehyde resin is about eight minutes, the water inlet valve 37 is closed and the water outlet valve 38 is opened. The water pressure immediately drops and the superheated water surrounding the dome flashes into steam, forcing the water to discharge through the check valve 39. In the matter of a very few seconds all the water is forced out of the space surrounding the dome 27. The steam from the superheated water condenses against the relatively cool surfaces of the flexible water hose 33 and the water outlet line 36. This condensation creates a vacuum in the system extending from the check valve 39 back up into the space surrounding the dome 27. The vacuum exerts a pulling force on the rubbery diaphragm 28 and causes it to collapse away from the molded helmet liner 49 and against the dome 27. This facilitates removal of the molded liner 49 from the mold and also holds the rubbery diaphragm 28 in position to receive another liner blank.

After the high pressure water has been exhausted from the molding apparatus the handle 48 on the latch casting 15 is moved to the right (Fig. 1) to unlatch the two mold members. The bottom mold member 12 is lowered to its normally open position by turning the four-way valve 22 in the air cylinder supply line 23 a quarter turn in a counter-clockwise direction. This forces air in at the top of the air cylinder and exhausts it out the bottom of the cylinder.

After the molding apparatus has been opened the molded helmet liner 49 is removed and its brim is trimmed to shape to produce the liner as illustrated in Fig. 4. The rubbery diaphragm 28 is again soaped with the soap solution preparatory to molding another helmet liner.

The molding apparatus described here has many advantages over the old types of molding equipment. It is extremely light in construction and is cheap to build and operate. The top mold member and the bottom mold member can be made from cast iron or similar material, all except the stainless steel shell of the upper member. In certain prior methods there is used an enclosed bag construction instead of the rubbery diaphragm and dome arrangement of the present arrangement. These bags, however, are not only more expensive and more difficult to make but they are also subject to failure in service because of inherent weaknesses in their construction, and the extreme forces to which they are subjected. In this invention these weaknesses are sharply curtailed if not completely eliminated, primarily because of the simple construction of the rubbery diaphragm. The diaphragm, instead of being a bag, is of an open cup-shaped construction with a widely-flaring skirt, or brim and consists of a single unitary piece of rubbery sheet material, reinforced with fabric or the like if desired, and molded to shape. This makes it simple and cheap to build. The diaphragm has an extremely long life because the material is never over-extended or bent sharply. The space between the top mold member and the bottom mold member which it occupies is so restricted that the diaphragm is never stretched excessively.

The rubbery diaphragm used in this invention may be made from any extensible rubbery material, either natural rubber, reclaimed rubber, or one of the many extensible synthetics. It is preferred, however, that a rubbery material be chosen that will not fail because of the heat used and that will resist acquiring a permanent set after being subjected repeatedly to the molding operation. It has been found that a neoprene composition serves admirably, specifically neoprene E compounded with carbon black and clay to give a durometer hardness of at least 70.

Having described my invention in considerable detail as applied to one specific embodiment of the invention, it is my intention that the invention be not limited by or to any of these details of construction or operation except as indicated in the claims but rather be construed broadly within the spirit and scope of the invention as set out in the appended claims.

I claim:

1. Apparatus for molding deeply contoured concavo-convex articles such as helmet liners and the like, said apparatus comprising a frame having a pair of upstanding columns, a deeply contoured concave mold member of metallic material mounted in an inverted position between the columns and in fixed relation thereto, said mold member being cored for heating and having communicating means for supplying heated fluid thereto, a horizontal platform mounted beneath the said concave mold member for vertical sliding movement between the columns toward and from the concave mold member, a convex member of metallic material mounted in upstanding position on the platform, said convex member being cored for heating and having communicating means for supplying heated fluid thereto, a concavo-convex diaphragm of extensible material overlying the convex member and being secured thereto around the base of the diaphragm so as to form a fluid-tight chamber between the diaphragm and the convex member, communicating means for supplying water or similar liquid under pressure to said chamber, communicating means for exhausting fluid from said chamber, a check valve in the exhaust means for preventing intake of fluid therethrough, a piston rod centrally engaging the bottom of said platform, a pneumatic cylinder for raising and lowering the piston rod and platform sufficiently to move the convex mold assembly into and out of molding relationship with the concave mold member, opposed lock seats on said columns, and a single locking member adapted to engage said seats and form a supporting bridge therebetween, said locking member being carried on the piston rod in supporting relation to the said platform and being mounted for manual rotation about the rod for engaging and disengaging said seats, the locking mechanism being so arranged as to maintain the convex mold assembly in molding relationship with the concave mold member during the molding operation.

2. Apparatus for molding deeply contoured concavo-convex articles such as helmet liners and the like, said apparatus comprising an upstanding frame, a deeply contoured concave mold member of metallic material mounted in fixed relation to the frame, said mold member being cored for heating and having communicating means for supplying heated fluid thereto, a horizontal platform mounted for vertical movement toward and from the concave mold member, a convex member of metallic material mounted on the platform in position to mate with the concave mold member, said convex member being cored for heating and having communicating means for supplying heated fluid thereto, a concavo-convex diaphragm of extensible material overlying the convex member and being secured thereto around the base of the diaphragm so as to form a fluid-tight chamber between the diaphragm and the convex member, communicating means for supplying water or similar liquid under pressure to said chamber, communicating means for exhausting fluid from said chamber, a check valve in the exhaust means for preventing intake of fluid therethrough, a piston rod engaging the platform opposite the said convex member, a pneumatic cylinder for raising and lowering the piston rod and platform, opposed lock seats on said frame, and a single locking member adapted to engage said seats and form a bridge therebetween, said locking member being carried on the piston contiguous the said platform and being mounted for manual rotation about the said piston rod for engaging and disengaging said seats, the locking mechanism being so arranged as to maintain the convex mold assembly in molding relationship with the concave mold member during the molding operation.

3. Apparatus for molding deeply contoured concavo-convex articles, said apparatus comprising an upstanding frame having opposed side members, a deeply contoured concave mold member of metallic material mounted in fixed relation to the frame, a horizontal platform mounted for vertical movement toward and from the concave mold member, a convex member of metallic material mounted on the platform in position to mate with the concave mold member, a concavo-convex diaphragm of extensible material overlying the convex member and forming a fluid-tight chamber therewith, communicating means for supplying pressure fluid to said chamber, a piston rod engaging the platform opposite the said convex member, a pneumatic cylinder for raising and lowering the piston rod and platform, opposed lock seats on said side frame members, and a single locking member adapted to engage both said seats and form a bridge therebetween, said locking member being carried on the platform and being mounted for manual rotation about the said piston rod for engaging and disengaging said seats, the locking mechanism being so arranged as to maintain the convex mold assembly in molding relationship with the concave mold member during a molding operation.

4. Apparatus for molding deeply contoured concavo-convex articles, said apparatus comprising an upstanding frame having opposed side members, a deeply contoured concave mold member, a mating convex mold member, said convex member comprising a convex dome of rigid material and an overlying concavo-convex diaphragm of extensible material forming a fluid-tight chamber with the dome and having communicating means for supplying pressure fluid to said chamber, one of said mold members being mounted for vertical movement into and out of molding relationship with the other, a piston rod engaging the movable mold member, a pneumatic cylinder for reciprocating said piston rod, opposed lock seats on said side frame members, and a single locking member adapted to engage both said seats and form a bridge therebetween, said locking member being carried on the moving assembly in supporting relation to the movable mold member and being mounted for manual rotation about the said piston rod for engaging and disengaging said seats, the locking mechanism being so arranged as to maintain the movable mold member in proper molding relationship during a molding operation.

5. Apparatus for molding deeply contoured concavo-convex articles, said apparatus comprising a framework having opposed frame members, a deeply contoured concave mold member, a mating convex mold member, said convex mold member comprising a convex dome of rigid material and, in nested relation therewith, a concavo-convex diaphragm of extensible material forming a fluid-tight chamber with the dome and having communicating means for supplying pressure fluid to said chamber, one of said mold members being mounted for movement into and out of molding relationship with the other, a piston rod operative to effect the aforesaid movement of the said one mold member, a pneumatic cylinder for reciprocating said piston rod, opposed lock seats carried by said opposed frame members, and a single locking member adapted to engage both said seats and form a bridge therebetween, said locking member being carried by the moving assembly of said movable mold member and said piston rod and being mounted for rotation about the said piston rod for engaging and disengaging said seats, the locking mechanism being so arranged as to maintain the movable mold member in proper molding relation to the other mold member during a molding operation.

6. Molding apparatus comprising a concave mold member, a mating convex mold member, one of said members being mounted for movement toward and from the other, means for positively locking the mold members in molding relationship, the convex mold member comprising a convex dome of rigid material and a concavo-convex diaphragm of extensible material overlying the rigid dome and forming a fluid-tight chamber therewith, means for supplying an evaporatable liquid under pressure to said chamber, means for positively confining said liquid in said chamber, means for heating said confined liquid to a temperature above its normal boiling point, and means for collapsing said diaphragm against said dome by reducing the pressure within said chamber through the evaporation of said liquid and the cooling of the evaporated liquid below its boiling point, the last said means comprising exhaust means for rapidly exhausting the chamber to substantially atmospheric pressure including means responsive to the flow of fluid through said exhaust means to prevent the intake of fluid through the exhaust means.

FRANK J. MacDONALD.

REFERENCES CITED

The following references are of record in the file of this patent:

UNITED STATES PATENTS

| Number | Name | Date |
|---|---|---|
| 1,023,764 | Senac | Apr. 16, 1912 |
| 1,841,490 | Maynard | Jan. 19, 1932 |
| 2,335,807 | Smith | Nov. 30, 1943 |
| 2,268,949 | Lehmann | Jan. 6, 1942 |
| 2,363,107 | Young | Nov. 21, 1944 |

OTHER REFERENCES

"The Army Helmet Liner" from Modern Plastics, May 1942, vol. 19, No. 9, pp. 35–38, 18-Fluid Pressure Digest.